United States Patent
Takeda et al.

(10) Patent No.: US 6,635,843 B1
(45) Date of Patent: Oct. 21, 2003

(54) STRIP CONNECTING APPARATUS AND METHOD THEREFORE

(75) Inventors: Akimichi Takeda, Tokyo (JP); Keiji Sodeno, Tokyo (JP); Masaru Yoshida, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/577,836

(22) Filed: May 25, 2000

(30) Foreign Application Priority Data

Dec. 1, 1999 (JP) .......................... 11-342107

(51) Int. Cl.[7] .................. B23K 11/02; B23K 11/04; B23K 9/02
(52) U.S. Cl. .................. 219/105; 219/91.21; 219/92; 219/118; 228/141.1
(58) Field of Search .............. 228/141.1, 170, 228/147; 219/66, 92, 118, 105; 156/510

(56) References Cited

U.S. PATENT DOCUMENTS

| | | | | |
|---|---|---|---|---|
| 3,800,118 A | * | 3/1974 | Wefers et al. ............. 219/91.21 |
| 3,805,014 A | * | 4/1974 | Becker ..................... 219/92 |
| 3,989,919 A | * | 11/1976 | Wefers et al. ............. 219/94 |
| 4,352,001 A | * | 9/1982 | Ishibashi et al. .......... 219/64 |
| 4,883,742 A | * | 11/1989 | Wallbillitch et al. ...... 101/463.1 |
| 4,968,369 A | * | 11/1990 | Darcy et al. ............. 156/217 |
| 4,973,089 A | * | 11/1990 | Wheeler et al. .......... 228/170 |
| 5,104,028 A | * | 4/1992 | Martincic et al. ......... 228/111 |
| 5,120,924 A | * | 6/1992 | Hirane ................... 219/108 |
| 5,211,326 A | * | 5/1993 | Lipp ..................... 228/13 |
| 5,379,693 A | * | 1/1995 | Hoffmann et al. ........ 101/216 |
| 5,470,429 A | * | 11/1995 | Shinomiya et al. ........ 156/510 |
| 5,552,573 A | * | 9/1996 | Okita et al. ............. 219/118 |
| 5,688,355 A | * | 11/1997 | Yu ....................... 156/257 |
| 5,698,118 A | * | 12/1997 | Takeda et al. ........... 219/105 |
| 5,732,874 A | * | 3/1998 | Borzym et al. ........... 228/147 |
| 6,040,549 A | * | 3/2000 | Kanaoka ................. 219/121.61 |
| 6,328,197 B1 | * | 12/2001 | Gapihan ................. 219/64 |

FOREIGN PATENT DOCUMENTS

| | | | |
|---|---|---|---|
| DE | 4313871 A1 | * 7/1999 | |
| JP | 1-80277 | 5/1989 | ........... B23K/11/16 |
| SU | 1389974 A | * 4/1988 | ................... 228/170 |

* cited by examiner

*Primary Examiner*—Tom Dunn
*Assistant Examiner*—L. Edmondson
(74) *Attorney, Agent, or Firm*—Sughrue Mion, PLLC

(57) ABSTRACT

To provide a strip connecting apparatus and a method therefor which are less costly, short in welding time and high in welding quality. A strip connecting apparatus is provided with: a surface coating removing device for removing insulative surface coating of end portions, to be welded, of a leading strip and a trailing strip before cutting the strips; a cutting device for cutting the end portions, to be welded, of the leading strip and the trailing strip; and a welding device for overlapping the cut end portions of the leading strip and the trailing strip and seam welding the cut end portions with each other.

14 Claims, 12 Drawing Sheets

STRIP CONNECTING APPARATUS AND METHOD THEREFORE

BACKGROUND OF THE INVENTION

1. Field of the Invention

The present invention relates to a strip connecting apparatus and method for connecting end portions of strips with each other by a seam welding method, and more particularly to a technology for overlapping end portions of strips one on another in which an insulation coating such as a scale coating, a plated layer or an insulative surface coating such as a surface coating layer is present on the surfaces of the strips for the seam welding.

2. Description of the Related Art

In order to weld in a stable manner the strips in which the insulative surface coating is present, it is necessary to remove the insulative surface coating. As a method for removing the insulative surface coating, there are known examples as follows.

(1) In the case where oxidized coating is present in welding material, it is removed by polishing the surface with a wire brush (see Japanese Patent Application Laid-Open No. Hei 5-104252 et al.)

(2) In the case where the laminate steel plate is welded, the resin coating on the surface of the steel plate is removed (see Japanese Patent Application Laid-Open No. Hei 5-177764).

(3) As a means for removing the applied coating of the coated steel plate, it is possible to use a thermal means with a high energy density beam such as a laser beam or an electron beam. For instance, it is possible to use a chemical means such as chemical agent or plasma or a mechanical means such as a grinder, a file or a sandblast or the like (Japanese Utility Model Application Laid-Open No. Hei 1-80277).

As apparent from these known examples, it is difficult to perform the welding method for the material in which the coating is present on the surface. It is a task how the coating is removed.

A flash welding method or an arc welding method such as MIG or TIG has been used for bonding the strips after the hot pressing process also in the steel process line, for example. (According to these welding methods, it is possible to perform the welding without any adverse affect on the insulative surface coating (see Japanese Patent Application Laid-Open No. Hei 3-52778).

However, these welding methods suffer from problems that, for example, the apparatus is expensive and the welding time is long. Therefore, in order to solve these problems, a welding method for a steel split has been proposed (Japanese Patent Application Laid-Open No. Hei 3-52778).

The Japanese Patent Application Laid-Open No. Hei 3-52778 discloses a method in which the respective leading steel strip (leading coil) and the trailing steel strip (trailing coil) which are overlapped one on another are depressed by a pressure down roller (swaging roll) and the insulation coating such as a scale coating or the like is removed by the working heat that occurs during this process.

However, according to this method, since the welding is completed under the condition that the scale of the weld bond portion is rolled in, it is impossible to ensure the welding quality in a stable manner.

Also, as a method for removing the surface coating on the strip, the method shown in FIGS. 16 and 17 are known. FIG. 16 shows a method in which, after strips 1a and 1b have been cut, upper and lower pairs of brushes 11, 12; 13, 14 are brought into contact with upper and lower surfaces of the strips 1a and 1b, respectively, to thereby remove the surface coating. If the brushing is repeated, as shown in FIG. 17, there is a problem in that an outer circumferential portion of the disc-like brushes 11 to 14 is locally abraded and it is impossible to perform the surface coating process in a stable manner. Namely, as shown in FIG. 17 on an enlarged scale, when the edges of the strips 1a and 1b are brushed, the brushes 11 to 14 are locally worn so that stepped portions are generated in the brushes 11 to 14. As a result, in some cases, edge portions A of the upper brushes 11 and 12 and the lower brushes 13 and 14 which have not been abraded are brought into contact with each other so that the strip surfaces that are to be abraded are not abraded.

Furthermore, FIG. 18 shows an example in which after the cut of the strips, the end portions of the two strips are brought into abutment against each other, and under this condition, the surface coating is to be removed by a pair of upper and lower disc-like brushes 41 and 42. As shown in FIG. 19, in the case where there is difference in thickness of the two strips 1a and 1b to be bonded, there is a problem in that the surface coating on one strip 1b (thinner strip) could not be removed.

SUMMARY OF THE INVENTION

Accordingly, in order to overcome the above-noted difficulties inherent in the conventional cases, an object of the present invention is to provide a strip connecting apparatus and a method therefor which are less costly, short in welding time and high in welding quality.

In order to attain the above-described object, a strip connecting apparatus according to the present invention is provided with a surface coating removing device for removing insulative surface coating of end portions, to be welded, of a leading strip and a trailing strip before cutting the strips, a cutting device for cutting the end portions, to be welded, of the leading strip and the trailing strip and a welding device for overlapping the cut end portions of the leading strip and the trailing strip and seam welding the cut end portions with each other.

Also, according to one embodiment of the present invention, the cutting device for cutting the end portions, to be welded, of the leading strip and the trailing strip, respectively, is a rotary shear.

Furthermore, according to another embodiment of the present invention, the cutting device for cutting the end portions, to be welded, of the leading strip and the trailing strip, respectively, is a guillotine shear.

Furthermore, according to still another embodiment of the present invention, the surface coating removing device for removing the insulative surface coating of the end portions, to be welded, of the leading strip and the trailing strip comprises a first removing device for removing the insulative surface coating of the leading strip and a second removing device for removing the insulative surface coating of the trailing strip, and the first removing device and the second removing device are installed independently of each other.

Also, according to still another embodiment of the present invention, the surface coating removing device and the welding device are provided on a common carriage that may move on a common base.

Furthermore, according to still another embodiment of the present invention, the surface coating removing device for removing insulative surface coating of the end portions, to be welded, of the leading strip and the trailing strip is composed of a rotary tool having a polishing surface for coming into contact with the surfaces of the leading strip and the trailing strip, and for cutting, and the polishing surface of the rotary tool is automatically controlled to be kept at a constant position relative to the surfaces of the leading strip and the trailing strip.

Furthermore, according to still another embodiment of the present invention, a rotary shaft of the rotary tool is arranged in parallel with the surfaces of the leading strip and the trailing strip, and an outer circumferential portion of the rotary tool is brought into contact with the surface of the leading strip and the trailing strip.

Also, according to still another embodiment of the present invention, a rotary shaft of the rotary tool is arranged to be slanted relative to a line vertical to the surfaces of the leading strip and the trailing strip, and an outer circumferential portion of the rotary tool is brought into contact with the surface of the leading strip and the trailing strip.

Furthermore, according to still another embodiment of the present invention, the cutting device is provided so as to be movable on a common base independently of a carriage that is movable on the common base and on which the welding device is mounted.

Also, according to still another embodiment of the present invention, the cutting device is provided on a common carriage that is movable on the common base and on which the welding device is mounted.

Furthermore, according to still another embodiment of the present invention, a dressing device for cutting a surface of a welding electrode of the welding device is further provided.

Also, a strip connecting method according to the present invention is comprised of the following steps of: removing surface coating of end portions, to be welded, of a leading strip and a trailing strip before cutting the strips; cutting the end portions, to be welded, of the leading strip and the trailing strip after removing the surface coating; and overlapping the cut end portions of the leading strip and the trailing strip and seam welding the cut end portions with each other.

Furthermore, according to still another embodiment of the present invention, the step of overlapping the cut end portions of the leading strip and the trailing strip and welding the cut end portions with each other, is comprised of: a plate alignment step for overlapping the cut end portions of the leading strip and the trailing strip; an overlap adjustment step for adjusting an overlap of the overlapped cut end portions of the leading and trailing strips; and a welding step for seam welding the overlapped cut end portions of the leading strip and the trailing strip with each other.

According to still another embodiment of the present invention, the strip connecting method is further comprised of: after the welding step, a dressing step for cutting the surface of the welding electrode for performing the seam welding operation.

DETAILED DESCRIPTION OF PREFERRED EMBODIMENTS

Preferred embodiments of this invention will now be described with reference to the accompanying drawings.

Embodiment 1

Figure 1:
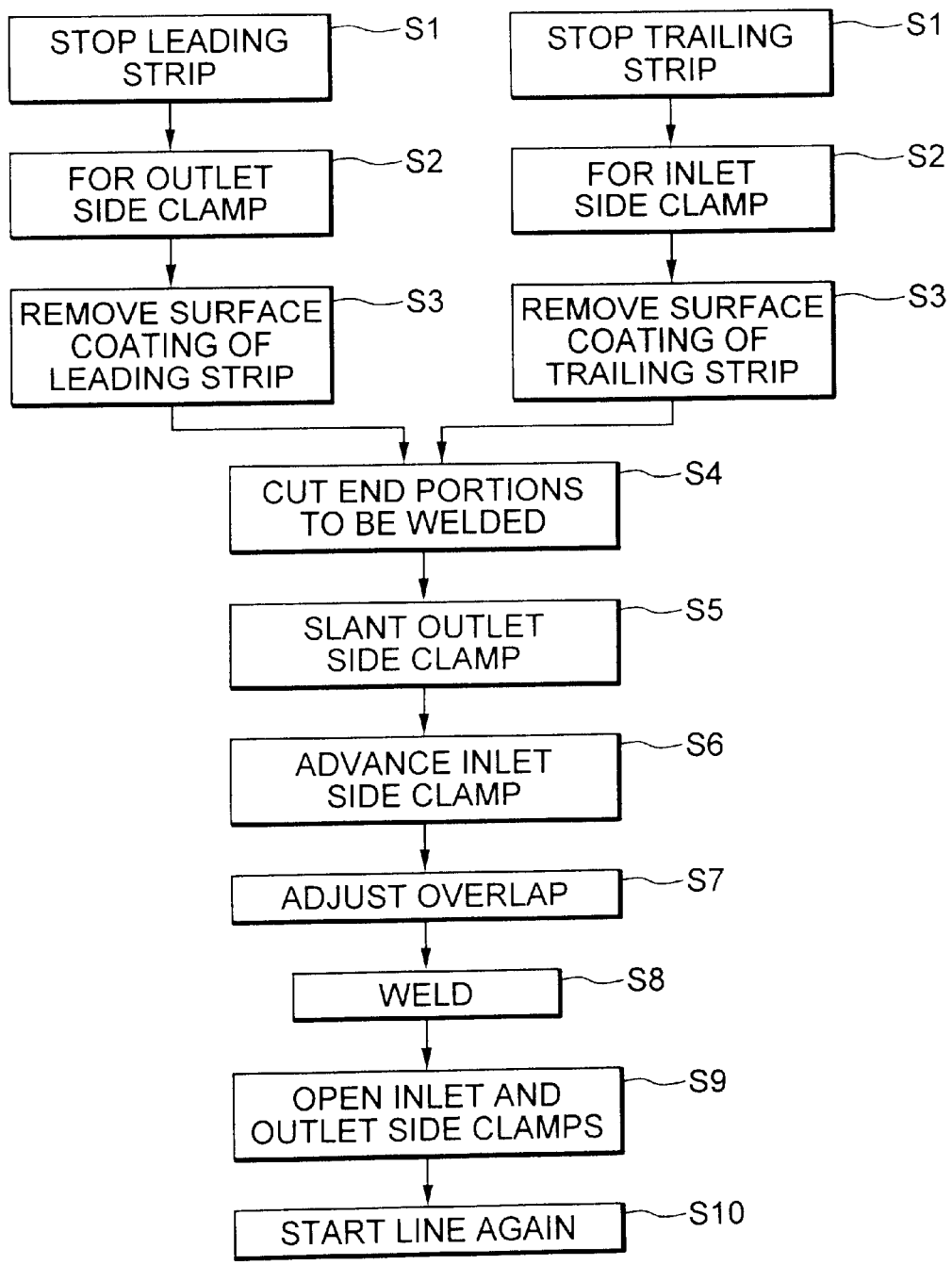
FIG. 1 is a flowchart illustrating a concept of the operation of an apparatus according to the present invention.
Figure 2:
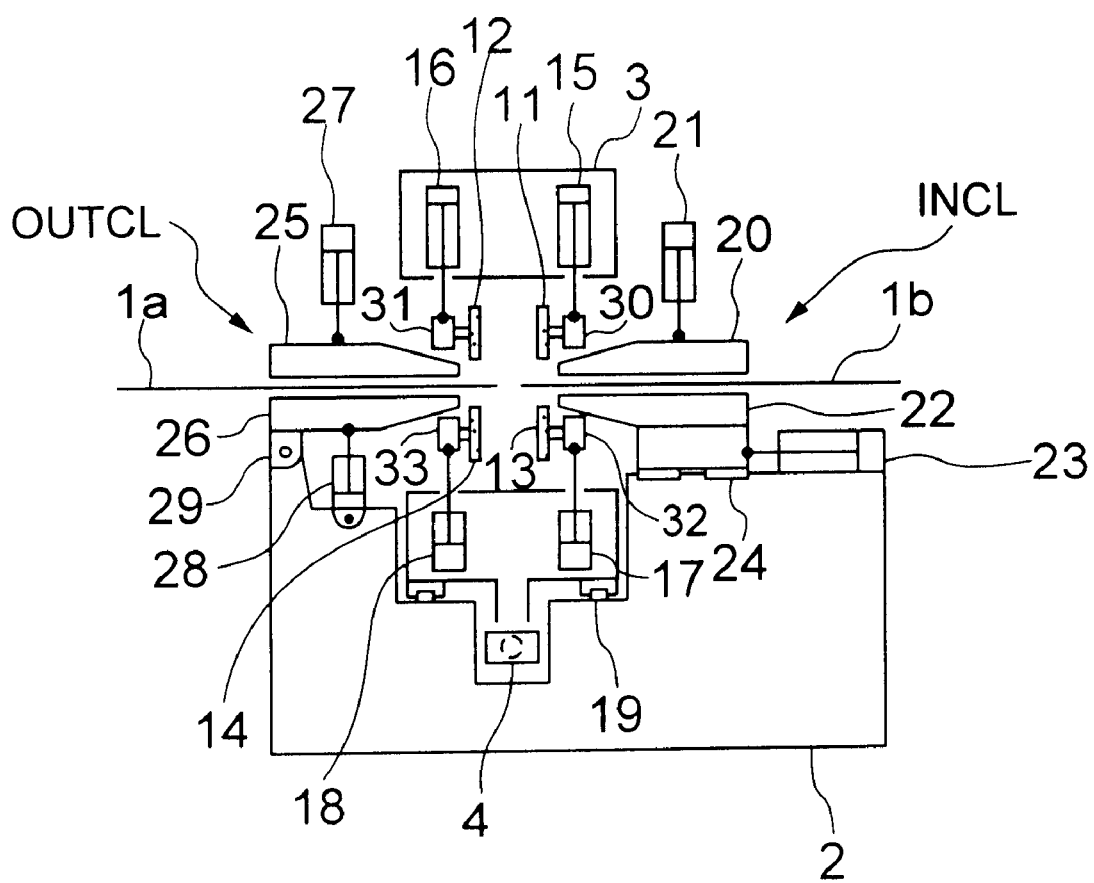
FIG. 2 is a frontal view showing a strip connecting apparatus according to the present invention.
Figure 3:
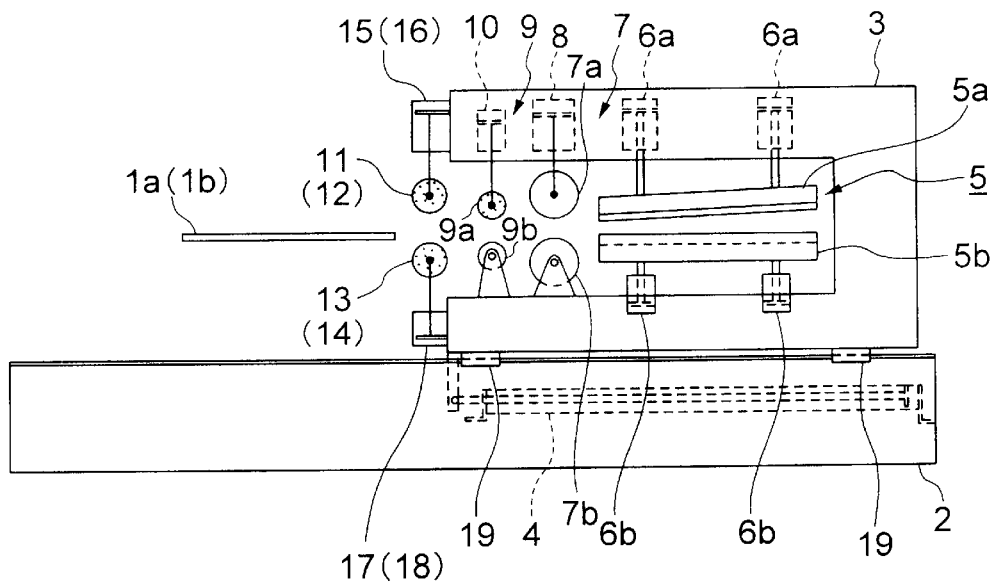
FIG. 3 is a side elevational view showing a standby position of the strip connecting apparatus according to the present invention.
Figure 4:
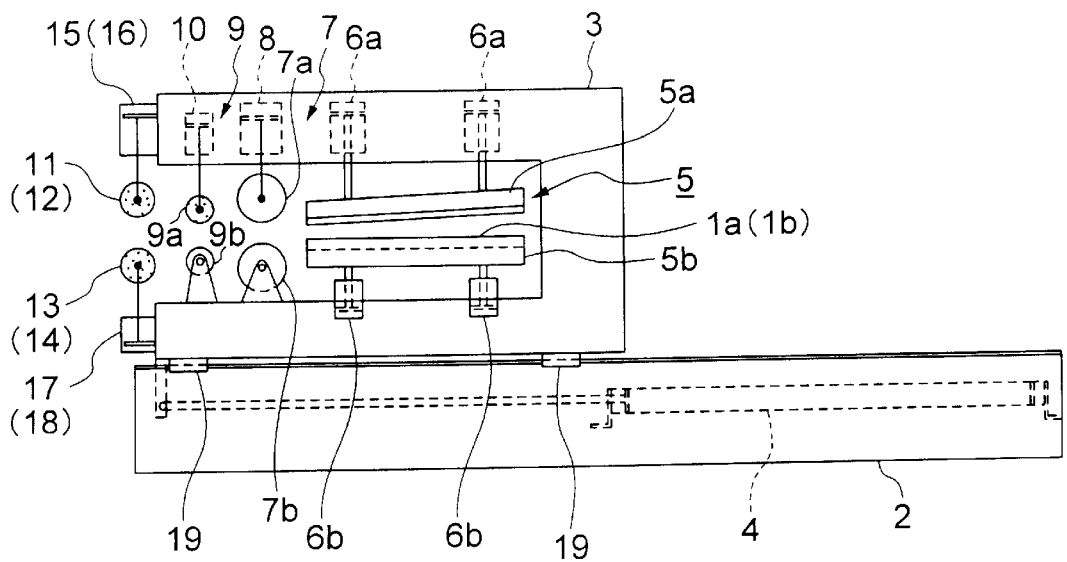
FIG. 4 is a side elevational view showing a shear position of the strip connecting apparatus according to the present invention.

FIG. 1 is a flowchart showing a concept of the operation of the strip connecting apparatus according to the present invention. FIGS. 2 to 8 show the strip connecting apparatus to be used for embodying the strip connecting method in accordance with embodiment 1 of the present invention. FIGS. 2 to 4 are a frontal view thereof, a side elevational view in a standby position and a side elevational view in a shear position, respectively.

In FIGS. 2 to 4, a leading strip 1a and a trailing strip 1b travel, and the strip connecting apparatus is used to connect the adjacent end portions of the leading strip 1a and the trailing strip 1b with each other.

Reference numeral 2 denotes a U-shaped common base for supporting the entire apparatus. A carriage 3 is laid on the common base 2. A shear device 5, a seam welding device 7 as a welding device and a swaging device 9 are supported to this carriage 3.

The shear device 5 is composed of an upper shear 5a, upper shear actuating cylinders 6a, a lower shear 5b and lower shear actuating cylinders 6b.

The seam welding device 7 is composed of a disc-like upper welding electrode 7a that is provided to be movable up and down in the upper portion of the carriage 3, a disc-like lower welding electrode 7b supported rotatably to the lower portion of the carriage 3 and disposed to face the upper welding electrode 7a in the vertical direction, and a seam welding pressure cylinder 8 for rotatably mounting the upper welding electrode 7a at a tip end of a piston rod and mounted on the upper portion of the carriage 3.

The swaging device 9 is provided with an upper swaging roll 9a provided movably up and down to the upper portion of the carriage 3, a lower swaging roll 9b supported rotatably to the lower portion of the carriage 3 and disposed to face the upper roll 9a in the vertical direction, and a swaging roll pressure cylinder 10 mounted on the upper portion of the carriage 3 and for rotatably mounting the upper swaging roll 9a at the tip end of the piston rod.

Numerals 11 to 14 denote brushes as rotary tools for removing the surface coating of the strip. The upper brushes 11 and 12 are mounted at tip ends of piston rods of upper brush ascending/descending cylinders 15 and 16 provided on the upper portion of the carriage 3, respectively, and the lower brushes 13 and 14 are disposed to face the upper brushes 11 and 12 in the vertical direction and are provided at tip ends of piston rods of lower brush ascending/descending cylinders 17 and 18 provided on the lower portion of the carriage 3, respectively.

A pair of carriage travel guides 19 for guiding the carriage 3 in the longitudinal direction along the common base 2 are provided on the lower portion of the carriage 3.

INCL represents an inlet side clamp mechanism and is provided with an inlet side clamp 20 disposed on the common base 2, an inlet side clamp cylinder 21 for ascending/descending the inlet side clamp 20, an inlet side clamp support 22 provided to face the inlet side clamp 20 in the vertical direction, an inlet side clamp back-and-forth moving cylinder 23 for moving drivingly move the inlet side clamp 20 in a direction transverse to the common base 2, inlet side clamp travel guides 24 for traveling the inlet side clamp 20 in the transverse direction of the common base 2.

OUTCL represents an outlet side clamp mechanism and is provided with an outlet side clamp 25 disposed on the common base 2 to face the inlet side clamp 20 in the transverse direction of the common base 2, an outlet side clamp support 26 disposed to face the outlet side clamp 25 in the vertical direction, an outlet side clamp cylinder 27 for ascending/descending the outlet side clamp 25, and an outlet side clamp slanting cylinder 28 for slanting the outlet side clamp 25 about a rotary shaft 29.

The brushes 11 to 14 are drivingly rotated by rotary motors 30 to 34, respectively.

The operation of this embodiment 1 will now be described with reference to the flowchart shown in FIG. 1.

FIG. 1 is the flowchart illustrating the concept of the operation of the apparatus according to the present invention, and represents the operation from the stop to the restart of the leading strip 1a and the trailing strip 1b. As apparent from the flowchart, the surface coating is removed from the strip in the preprocess of the cutting operation of the end of the strip to be welded.

As shown in FIG. 2, when the trailing edge of the leading strip 1a and the leading edge of the trailing strip 1b are stopped at the welding positions, respectively (step S1 of FIG. 1), the outlet side clamp 25 is lowered by the outlet side clamp cylinder 27, so that the leading strip 1a is held by the outlet side clamp 25 and the outlet side clamp support 26. In the same manner, the inlet side clamp 20 is lowered by the inlet clamp cylinder 21, so that the trailing strip 1b is held by the inlet clamp 20 and the inlet clamp support 22 (step S2). The carriage 3 is disposed in the position shown in FIG. 3 relative to the leading and trailing strips 1a and 1b thus clamped and held.

Figure 5:
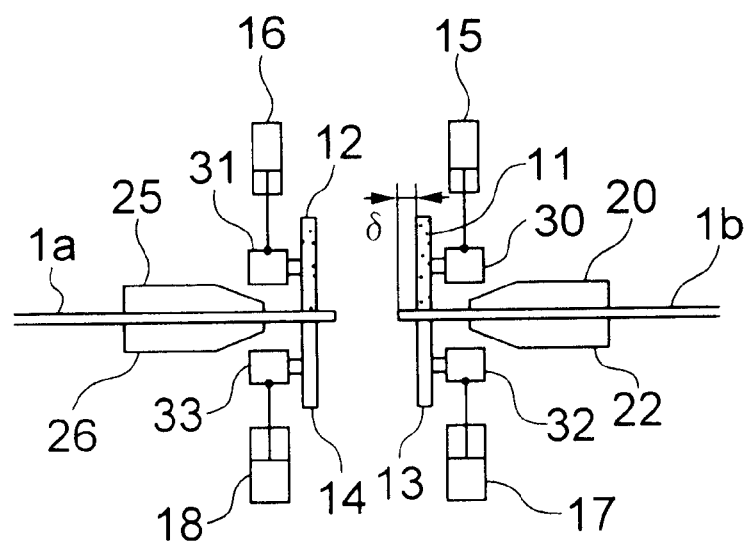
FIG. 5 is a view illustrating a brushing process according to the present invention.

Under this condition, the upper brush ascending/descending cylinders 15 and 16 are operated and as shown in FIG. 5, the upper brushes 11 and 12 are lowered down to the upper surfaces of the leading and trailing strips 1a and 1b, and on the other hand, the lower brush ascending/descending cylinders 17 and 18 are operated to raise the lower brushes 13 and 14 up to the lower surfaces of the leading and trailing strips 1a and 1b. Then, the carriage travel cylinder 4 is operated to travel the carriage 3 in the longitudinal direction of the common base 2 while rotating the rotary motors 30 to 33 to thereby remove the coating on the surfaces of the strips (i.e., the coating of the end portions to be welded) (step S3).

Figure 16:
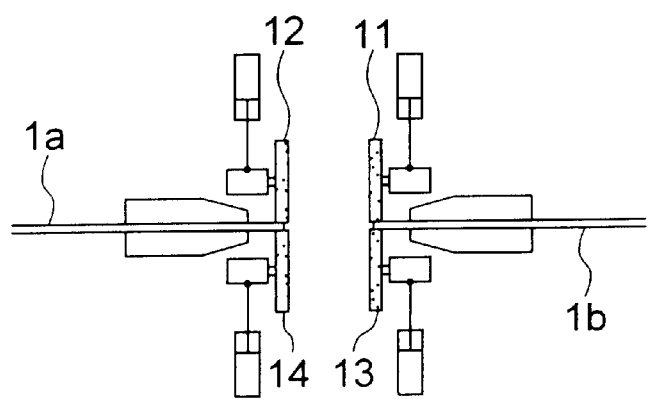
FIG. 16 is a view showing an example of a conventional brushing process.
Figure 17:
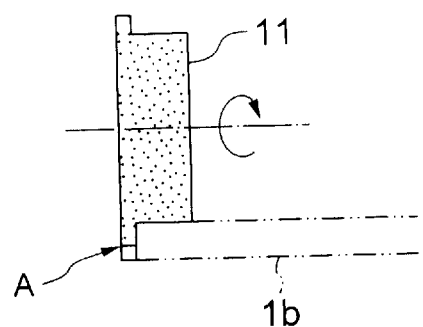
FIG. 17 is a view showing a local wear condition of the brush i n the brushing process shown in FIG. 16.
Figure 18:
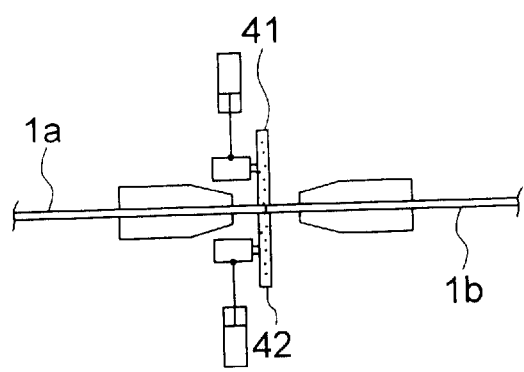
FIG. 18 is a view showing another example of the conventional brushing process.
Figure 19:
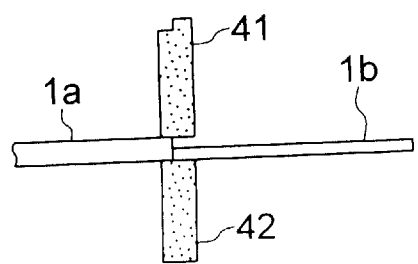
FIG. 19 is a view showing a local wear condition of the brush in the brushing process shown in FIG. 18.

As shown in FIG. 5, in the surface coating removing step, the surface coating of a position (cutting portion/welding portion) separated away by a predetermined length δ from the strip end surface is removed. Thus, it is possible to overcome the problem in that the surface coating could not be well removed due to the local abrasion of the brush generated in the conventional case in conjunction with FIGS. 16 and 17. Also, this length δ is changed in correspondence with the stop precision (positioning precision) of the strips 1a and 1b.

Figure 6:
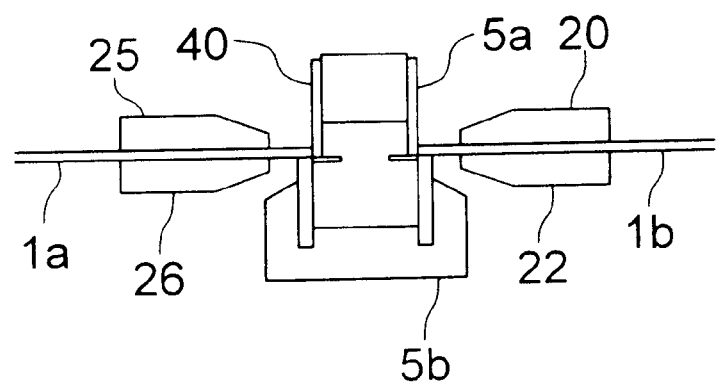
FIG. 6 is a view illustrating a shear cutting process according to the present invention.

When the removal of the surface coating has been completed, the state of the carriage 3 takes a position shown in FIG. 4. In this position, the end portions of the leading strip 1a and the trailing strip 1b are cut by the shear device 5 (step S4). This condition is shown in FIG. 6.

Figure 7:
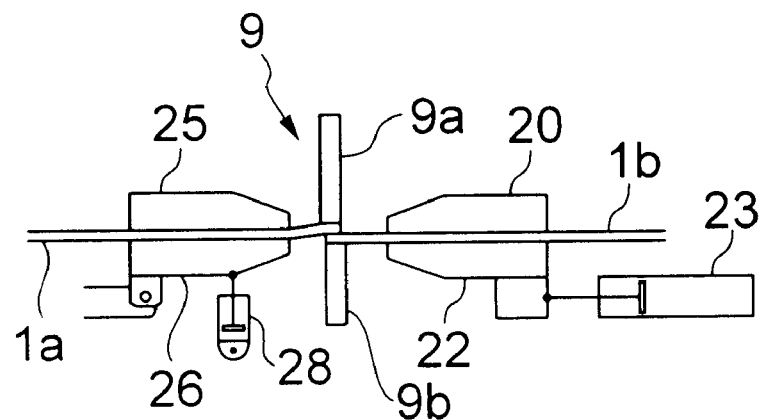
FIG. 7 is a view illustrating a welding process according to the present invention.
Figure 8:
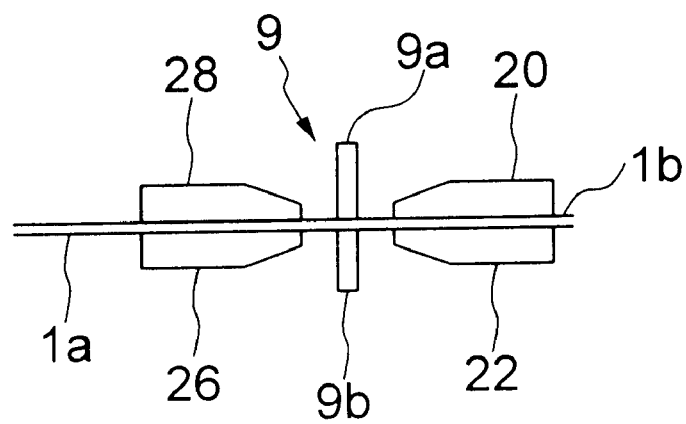
FIG. 8 is a view illustrating a swaging process according to the present invention.

After the cutting operation by the shear device 5, the leading strip 1a is somewhat slanted from the horizontal direction by the outlet side clamp slanting cylinder 28 (step S5). Then, as shown in FIG. 7, the trailing strip 1b is advanced toward the leading strip 1a in the transverse direction of the common base 2 by the inlet side clamp back-and-forth moving cylinder 23 (step S6). The end portions of the leading strip 1a and the trailing strip 1b are overlapped with each other to adjust the overlap (step S7).

Subsequently, the carriage travel cylinder 4 is operated so that the carriage 3 is moved in the longitudinal direction of the common base 2. The disc-like welding electrodes 7a and 7b of the seam welding device 7 are positioned at the overlapped end portions of the leading strip 1a and the trailing strip 1b. Under this condition, the seam welding pressure cylinder 8 is operated so that the upper welding electrode 7a is lowered. The overlapped end portions of the leading strip 1a and the trailing strip 1b are kept under the condition that they are depressed between the upper and lower welding electrodes 7a and 7b. The carriage 3 is moved along the welded end portions in the longitudinal direction of the common base 2 and the current is caused to flow through the electrodes 7a and 7b to thereby perform the seam welding (step S8). In this welding operation, the swaging device 9 is operated to swage the welding portions. Namely, the swaging roll pressure cylinder 10 is operated and the upper swaging roll 9a is lowered, and the swaging rolls 9a and 9b are moved to depress the welding portions while welding due to the movement of the welding electrodes 7a and 7b.

After completion of welding, the seam welding device 7 and the swaging device 9 are returned back to the original position shown in FIGS. 3 and 4 and the inlet side clamp 20 and the outlet side clamp 21 are released (step S9). The carriage 3 is returned back to the original position shown in FIG. 3 and the line is started (step S10).

Embodiment 2

Figure 9:
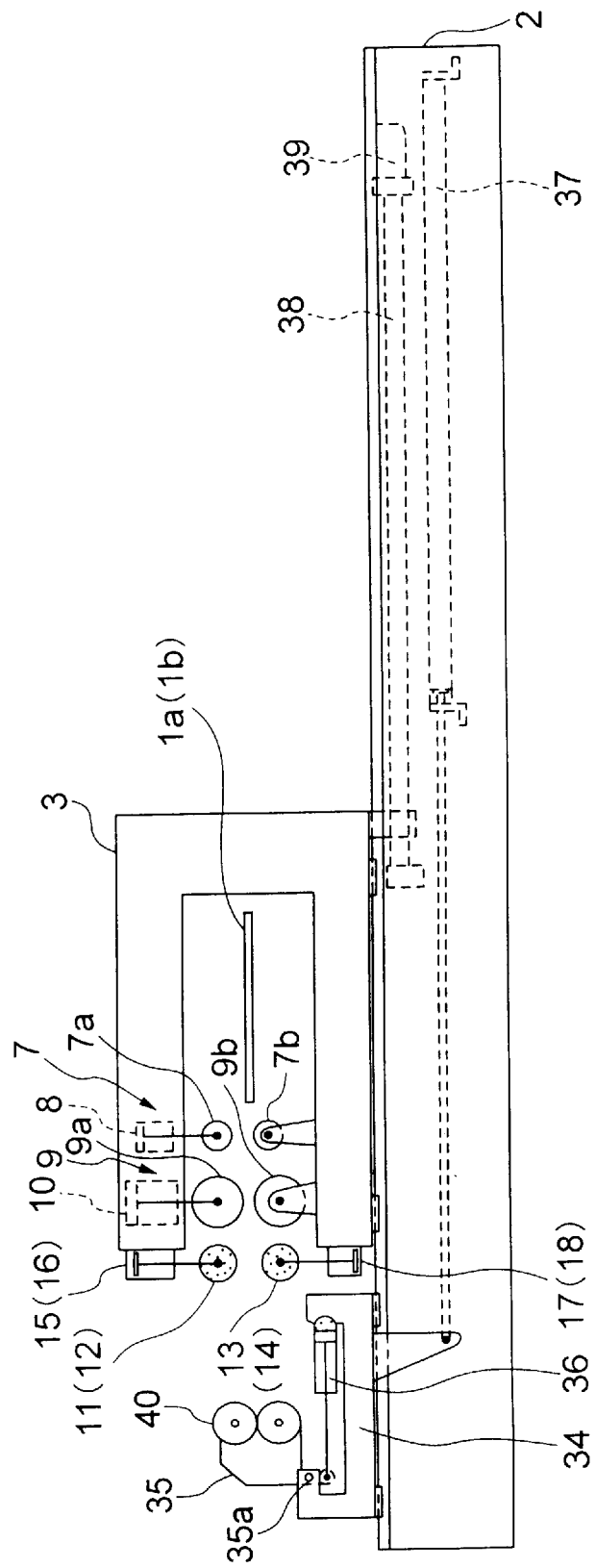
FIG. 9 is a side elevational view showing a standby position of a strip connecting apparat us in accordance with embodiment 2 of the present invention.
Figure 10:
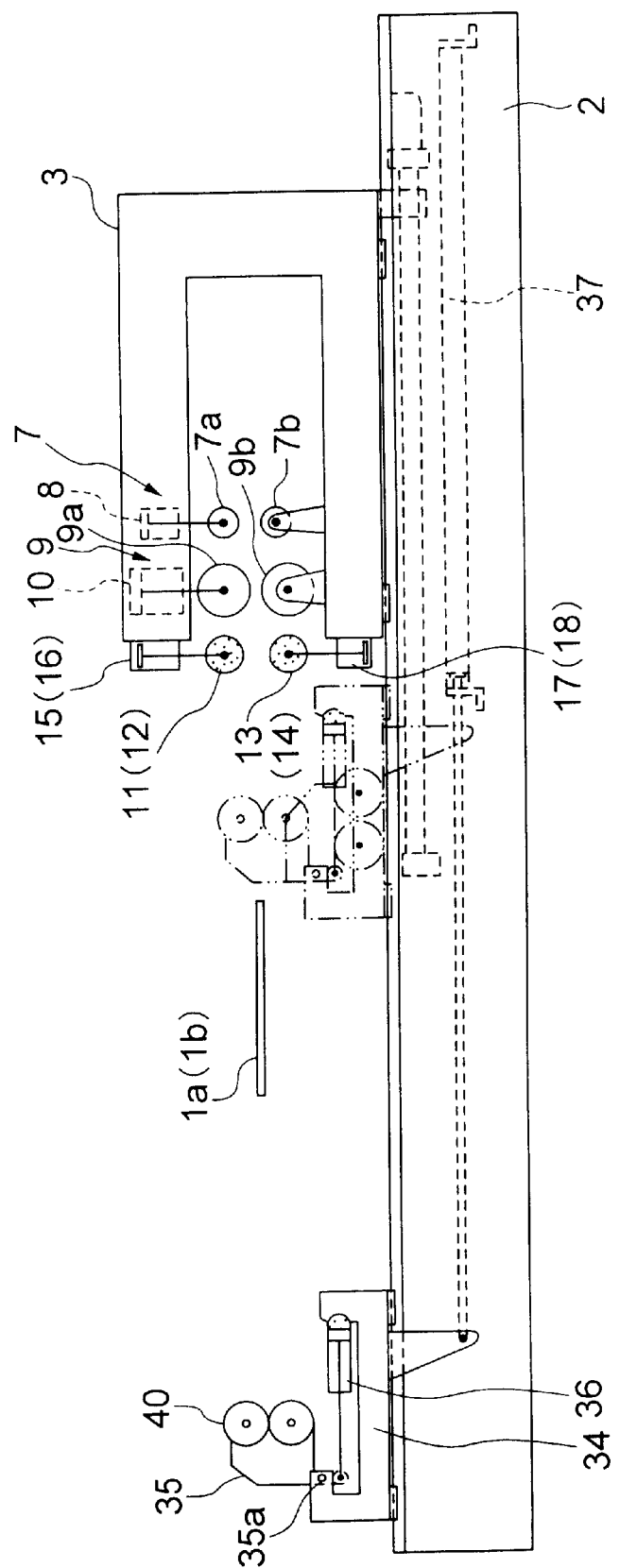
FIG. 10 is a side elevational view showing a shear position of the strip connecting apparatus in accordance with embodiment 2 of the present invention.

The foregoing explanation has been directed to a case in which a cutting device is a guillotine shear. FIGS. 9 and 10 show a strip welding apparatus according to embodiment 2 of the present invention in which the cutter device is constituted by a rotary shear.

In FIGS. 9 and 10, reference numeral 34 denotes a rotary shear support. A rotary shear head 35 is mounted on the rotary shear support 34. A pair of rotary shear blades 40 are mounted on the rotary shear head 35. The rotary shear blades 40 are rotated to swing and rise about a rotary shaft 35a by a rotary shear swing and upright cylinder 36. The rotary shear support 34 is drivingly moved in the longitudinal direction of the common base 2 by a rotary shear travel cylinder 37.

A linear bearing 38 is mounted along the longitudinal direction of the common base 2. The linear bearing 38 is rotated to cause the movement of the carriage 3 in the longitudinal direction of the common base 2 by operating a carriage travel motor 39 connected to one end of the linear bearing 38.

The operation of embodiment 2 will now be described.

In FIG. 9, first of all, the brushes 11 to 14 are moved to a position shown in FIG. 5. Namely, the upper brushes 11 and 12 are lowered to the upper surfaces of the strips 1a and 1b and the lower brushes 13 and 14 are raised up to the lower surfaces of the strips 1a and 1b. Then, the carriage 3 is moved from left to right in FIG. 9 while rotating the rotary motors 30 to 33 to thereby remove the surface coating of the strips.

Thereafter, as shown in FIG. 10, the rotary shear head 35 is moved from left to right and the strips 1a and 1b are cut by the pair of upper and lower rotary shear blades 40. When the cutting operation has been completed, the rotary shear head 35 is stopped at a position shown by one-dot-and-dash lines in FIG. 10. The rotary shear head 35 is rotated to the swung position shown by two-dot-and-dash lines about the rotary shaft 35a by the rotary shear swing and upright cylinder 36. Then, after the cutting operation has been completed, the rotary shear head 35 is returned back to the original position on the left side passing below the strips 1a and 1b by the action of the rotary shear travel cylinder 37.

After the cutting operation has been completed, in the same manner as in the foregoing embodiment 1, the end portions of the strips 1a and 1b are overlapped with each other and the welding and swaging operations (depression of the welded portion) are effected.

Embodiment 3

In the foregoing embodiments 1 and 2, whenever the surface coating of the strips 1a and 1b is removed, the brushes 11 and 14 are worn out. Accordingly, in order to ensure the desired surface coating removing effect, it is necessary to keep constant the positional relationship between the surfaces of the strips 1a and 1b and the brushes 11 to 14 regardless of the degree of wear of the brushes 11 to 14.

Figure 11:
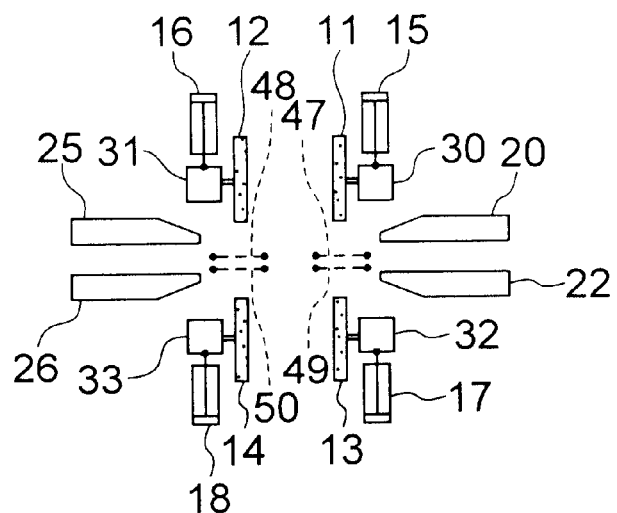
FIG. 11 is a view illustrating a brush position control in accordance with embodiment 3 of the present invention.

FIG. 11 is a side elevational view showing a primary part of embodiment 3 of the invention provided with a mechanism for adjusting, to constant, the positional relationship between the surfaces of the strips 1a and 1b and the brushes 11 to 14.

In FIG. 11, numerals 47 to 50 denote detectors for optically detecting the brush positions. The upper brushes 11 and 12 are lowered and the brush positions are detected at the strip surfaces by the detectors 47 to 50. At this time, the brushes are stopped and the brushes 11 and 12 are kept at the constant positions to the strip surfaces.

Embodiment 4

Figure 12:
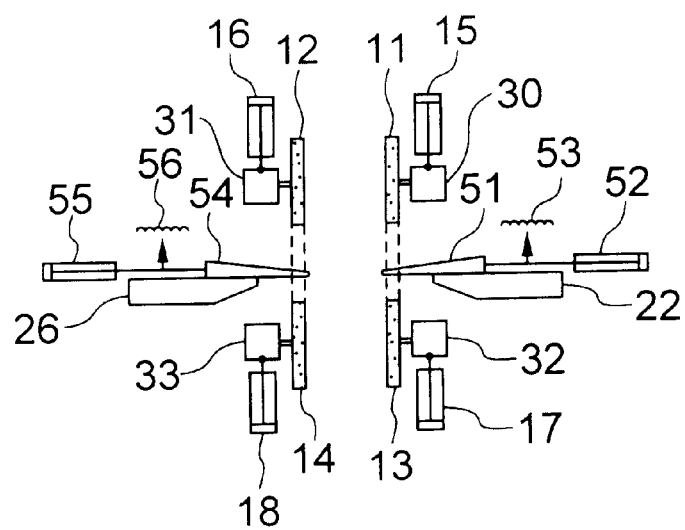
FIG. 12 is a view illustrating a brush position control in accordance with embodiment 4 of the present invention.

FIG. 12 is a side elevational view showing a primary part of embodiment 4 of the present invention provided with a mechanism for adjusting, to constant, the positional relationship between the surfaces of the strips 1a and 1b and the brushes 11 to 14. In embodiment 4, the brushes 11 and 12 are brought into abutment against brush positioning pieces 51 and 54 to be mechanically stopped, thereby performing the positioning operation.

In FIG. 12, the brush positioning pieces 51 and 54 are provided on the top surfaces of the inlet side clamp support 22 and the outlet side clamp support 26, respectively. These brush positioning pieces 51 and 54 are connected to the tip ends of piston rods of brush positioning piece moving cylinders 52 and 55, and one of the upper and lower surfaces thereof is slanted (i.e., tapered). Numeral 53 and 56 denote position detectors for detecting the positions of the brush positioning pieces 51 and 54, respectively.

The brush positioning pieces 51 and 54 select the positions corresponding to a thickness of the strips 1a and 1b and keep constant the positional relationship between the strip surfaces and the brushes. Incidentally, the brush positioning pieces may take a shape having a stepped portion.

Embodiment 5

Figure 13:
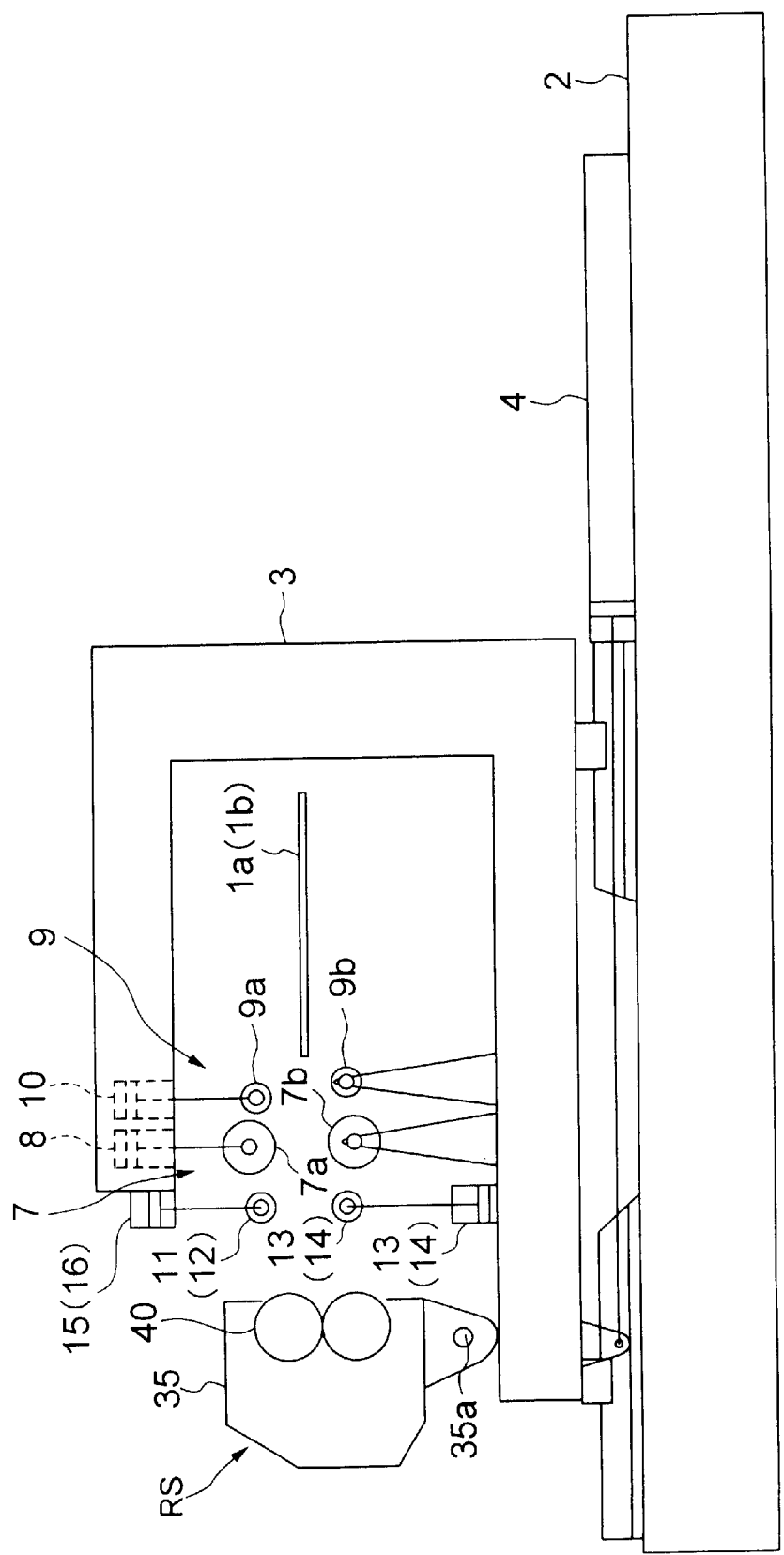
FIG. 13 is a side elevational view showing a strip connecting position of a strip connecting apparatus in accordance with embodiment 5 of the present invention.

In the foregoing embodiment 2, the rotary shear is provided separately from the carriage 3. However, in embodiment 5, a rotary shear RS is provided on the carriage 3 together with the brushes 11 (12), 13(14), the welding device 7 and the swaging device 9. As shown in FIG. 13, the rotary shear RS is provided on the carriage 3 so that the rotary shear head 35 is rotatable about the rotary shaft 35a supported to the carriage 3 by a rotary shear swinging cylinder (not shown) and is moved on the common base 2 together with the carriage 3. The other structure and effect are the same as those of embodiment 2.

Embodiment 6

By the way, it is possible to remove the surface coating of the strips by brushing for a long period of time. However, as a matter of fact, it is difficult to completely remove the surface coating. Accordingly, the surface coating residual after the brushing operation is unified and made alloy with the welding electrodes. If the welding electrodes are made alloy, in the next welding operation, the conductivity of the strips and the electrode surfaces changes, resulting in failure of the stable welding operation. Also, the hardness of the electrode surfaces is degraded, which is not preferable for the welding operation.

Figure 14:
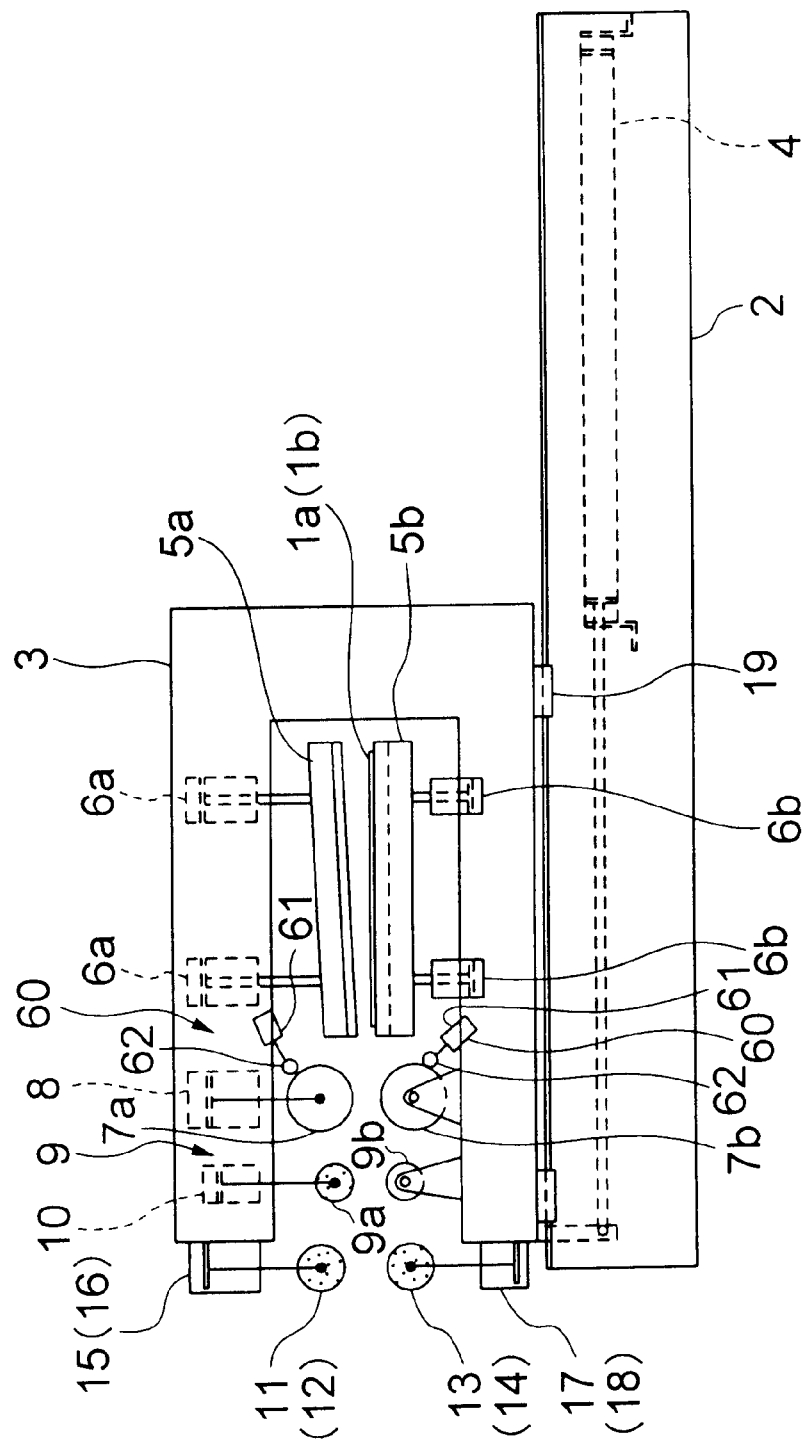
FIG. 14 is a side elevational view showing a strip connecting position of a strip connecting apparatus in accordance with embodiment 6 of the present invention.

Accordingly, in embodiment 6, as shown in FIG. 14, in order to perform the stable welding operation for a long period of time, a dressing device 60 for removing the portion that is made alloy by cutting the electrode surfaces is provided in addition to the structure of embodiment 1. In embodiment 6, the dressing device 60 is formed by mounting cutting tools 62 to tip ends of piston rods of a pair of upper and lower cylinders 61 provided on the carriage 3. After the completion of the welding operation, if necessary, each piston rod of the cylinder 61 is extended so that the cutting tools 62 at tip ends are brought into contact with the disc-like upper and lower electrodes 7a and 7b at a suitable pressure, respectively, and the surface alloy portions are cut and removed from the surfaces by rotating the upper and lower electrodes 7a and 7b. Thus, it is possible to perform the dressing operation of the upper and lower electrodes 7a and 7b effectively without removing the electrodes 7a and 7b. The other structure and effect of embodiment 6 are the same as those of embodiment 1.

Also, it goes without saying that if the like dressing device is provided in embodiment 2 or embodiment 3, the same effect may be ensured.

Embodiment 7

Figure 15:
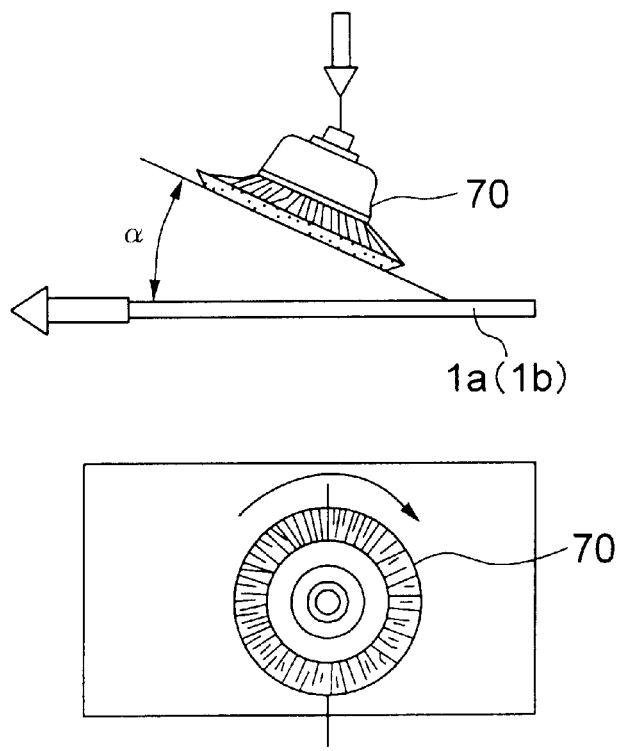
FIG. 15 is a view showing a brush mounting condition in accordance with embodiment 7 of the present invention.

Also, in each of the foregoing embodiments, the disc-like brushes 11 to 14 are rotated about the rotary shafts in parallel with the surfaces of the strips 1a and 1b and the outer circumferential portions of the brushes are brought into contact with the strip surfaces to thereby perform the polishing operation. However, in embodiment 7, as shown in FIG. 15, a brush 70 having a circular polishing surface is used as the brush. A rotary shaft 71 of the brush 70 is arranged to be slanted at a predetermined angle α from a line vertical to the surface of the strip 1a (1b). With such an arrangement, since only the outer circumferential portion of the disc-like brush 70 is brought into contact with the strip surface, it is possible to increase the contact pressure and to brush the strip surface effectively. In this case, although the efficiency is worse, the rotary shaft 71 of the brush 70 is arranged to be vertical to the strip surface so that the entire polishing surface of the brush 70 may be brought into contact with the surface of the strip 1a (1b).

In the foregoing description, when the end portions of the strips are connected to each other, it is necessary to carry out the width alignment. This may, however, be done before or after the cutting operation.

Also, according to the present invention, the case where the brush is used as a tool for removing the surface coating has been described. It is possible to ensure the same effect if one is selected for the tool from the group of a paper brush, a wire brush, a resin made brush, a buff and a grindstone.

Also, the rotational drive of the brush may be performed by using an electric motor, a pneumatic motor, a hydraulic motor or the like.

Furthermore, the method for moving the trailing strip (i.e., the inlet side clamp support) is adopted as the method for overlapping the strips. However, it is possible to use the method for moving the leading strip, and for overlapping the strips.

The swaging roll for depressing the welding portion after the welding operation may be dispensed with for the present invention. This may ensure substantially the same effect.

Also, in the foregoing embodiments, the explanation has been given as to the case where the surface coating of the strip to be removed is the insulation coating. However, the present invention may be applied to a welded material in which a plating layer is applied to the surface of the strip, a strip in which the surface is coated or the like. In any case, it is possible to remove the surface coating that is different in composition from the welding base (strip) to thereby perform the welding operation in a stable manner.

As described above, the present invention ensures the following advantages.

Since the surface coating is removed before the strip is cut, only the brush device is added to the ordinary seam welding device so that the less costly strip connecting apparatus may be provided. Accordingly, it is unnecessary to use an expensive welding device such as a flash welding device.

In the conventional MIG and TIG welding method, the welding rate is low and it takes long time to connect the strips. However, in the strip connecting apparatus and method according to the present invention, since the strips are connected by the seam welding after the insulative surface coating is removed from the strips, it is possible to perform the connecting operation in a short period of time, and in addition, it is possible to always ensure the stable welding quality.

Also, the surface coating is removed before the strip is cut, in the case where the thickness of the leading strip is different from that of the trailing strip, it is possible to remove the surface coating in a stable manner without any local wear of the brushes.

Furthermore, the automatic control is effected so that the polishing surface of the rotary tool that constitutes the surface coating removing device is kept at the constant position to the strip surface, it is possible to keep constant the positional relationship between the strip surface and the brush regardless of the degree of wear of the rotary tool and to always ensure the desired surface coating removing effect.

Furthermore, if necessary, the surface of the welding electrode is cut or ground to remove an alloyed portion thereon so that the stable welding operation may be ensured for a long period of time.

What is claimed is:

1. A strip connecting apparatus comprising:
    a surface coating removing device for removing an insulative surface coating from respective surfaces of a leading strip and a separate trailing strip before cutting the strips, said surface coating removing device being operative to remove a portion of said insulative coating, such that a portion of surface coating remains on ends of the respective strips;
    a cutting device for cutting end portions of said leading strip and said trailing strip where the insulative coating has been removed; and
    a welding device for overlapping said cut end portions of said leading strip and said trailing strip and seam welding said cut end portions with each other.

2. The strip connecting apparatus according to claim 1, wherein said cutting device for cutting said end portions, to be welded, of the leading strip and the trailing strip, respectively, is a rotary shear.

3. The strip connecting apparatus according to claim 1, wherein said cutting device for cutting said end portions, to be welded, of the leading strip and the trailing strip, respectively, is a guillotine shear.

4. The strip connecting apparatus according to claim 1, wherein said surface coating removing device for removing the insulative surface coating of said leading strip and said trailing strip comprises:
    a first removing device for removing said insulative surface coating of the leading strip; and
    a second removing device for removing said insulative surface coating of the trailing strip, and
    said first removing device and said second removing device are installed independently of each other.

5. The strip connecting apparatus according to claim 1, wherein said surface coating removing device and said welding device are provided on a common carriage that may move on a common base.

6. The strip connecting apparatus according to claim 1, wherein said surface coating removing device for removing insulative surface coating of said leading strip and said trailing strip is composed of a rotary tool having a polishing surface for coming into contact with the surfaces of said leading strip and said trailing strip and for cutting, and said polishing surface of the rotary tool is automatically controlled to be kept at a constant position relative to said surfaces of the leading strip and the trailing strip.

7. The strip connecting apparatus according to claim 1, wherein a rotary shaft of a rotary tool is arranged in parallel with said surfaces of the leading strip and the trailing strip, and an outer circumferential portion of said rotary tool is brought into contact with said surfaces of the leading strip and the trailing strip.

8. The strip connecting apparatus according to claim 1, wherein a rotary shaft of a rotary tool is arranged to be slanted relative to a line vertical to said surfaces of the leading strip and the trailing strip, and an outer circumferential portion of said rotary tool is brought into contact with said surfaces of the leading strip and the trailing strip.

9. The strip connecting apparatus according to claim 1, wherein said cutting device is provided so as to be movable on a common base independently of a carriage that is movable on said common base and on which said welding device is mounted.

10. The strip connecting apparatus according to claim 1, wherein said cutting device is provided on a common carriage that is movable on the common base and on which said welding device is mounted.

11. The strip connecting apparatus according to claim 1, further comprising a dressing device for cutting a surface of a welding electrode of said welding device.

12. A strip connecting method comprising the following steps of:

removing a surface coating of portions of a leading strip and a separate trailing strip before cutting the strips, said removing of the insulative surface coating being performed at a location separated away from respective ends of the leading strip and the trailing strip such that a portion of surface coating remains on the ends of the respective strips;

cutting end portions, to be welded, of the leading strip and the trailing strip where the surface coating has been removed; and overlapping the cut end portions of the leading strip and the trailing strip and seam welding the cut end portions with each other.

13. The strip connecting method according to claim 12, wherein said step of overlapping said cut end portions of the leading strip and the trailing strip and welding the cut end portions with each other, comprises:

a plate alignment step for overlapping said cut end portions of the leading strip and the trailing strip;

an overlap adjustment step for adjusting an overlap of said overlapped cut end portions of the leading and trailing strips; and a welding step for seam welding said overlapped cut end portions of the leading strip and the trailing strip with each other.

14. The strip connecting method according to claim 13, further comprising: after said welding step, a dressing step for cutting the surface of a welding electrode for performing the seam welding operation.

* * * * *